(12) United States Patent (10) Patent No.: US 8,298,377 B2
Kurata (45) Date of Patent: Oct. 30, 2012

(54) EQUIPMENT AND PROCESS FOR UPGRADING OIL

(75) Inventor: Taishi Kurata, Kobe (JP)

(73) Assignee: Tapioca-Comercio E Services (PT)

( * ) Notice: Subject to any disclaimer, the term of this patent is extended or adjusted under 35 U.S.C. 154(b) by 0 days.

(21) Appl. No.: 13/287,448

(22) Filed: Nov. 2, 2011

(65) Prior Publication Data

US 2012/0043179 A1 Feb. 23, 2012

Related U.S. Application Data

(63) Continuation of application No. 12/226,556, filed as application No. PCT/JP2006/308862 on Apr. 26, 2006, now Pat. No. 8,088,273.

(51) Int. Cl.
*C10G 9/00* (2006.01)
(52) U.S. Cl. ........................................................ 196/46
(58) Field of Classification Search ..................... 196/46
See application file for complete search history.

(56) References Cited

U.S. PATENT DOCUMENTS 701,186 A * 5/1902 Faulkner ........................... 48/92

* cited by examiner

*Primary Examiner* — Randy Boyer
(74) *Attorney, Agent, or Firm* — Gerald E. Hespos; Michael J. Porco

(57) ABSTRACT

Equipment and a process for upgrading oil are provided to produce a refined oil lighter than a material oil by cracking the heavier material oil with the addition of hydrogen under relatively relaxed production conditions. An equipment for upgrading oil according to one aspect of the invention includes an emulsion making portion (10), a refinery tank portion (20), and a heating portion (30), and configured to make an emulsion (E) by emulsifying ionized alkaline water (A) in a material oil (O1) in the emulsion making portion (10), and to drop droplets (D) of the emulsion (E) onto the surface (S) of a heat medium (O2) in the refinery tank portion (20) heated by the heating portion (30).

6 Claims, 6 Drawing Sheets

EQUIPMENT AND PROCESS FOR UPGRADING OIL

The present application is a continuation application of U.S. patent application Ser. No. 12/226,556, filed Oct. 20, 2008, the contents of which are hereby incorporated by reference in their entirety.

BACKGROUND OF THE INVENTION

1. Field of the Invention

The present invention relates to equipment and process for upgrading oil to enable production of a lighter refined oil from a heavier material oil.

2. Description of the Related Art

There is a trend toward lighter products in worldwide oil situations in recent years. So-called light oils (light hydrocarbon oils), such as a gasoline, a heating oil, and a gas oil, can be obtained not only by means of distillation of oil, such as atmospheric distillation and vacuum distillation, but also by cracking so-called heavy oils (heavy hydrocarbon oils). The process of obtaining a light oil from a heavy oil includes catalytic cracking by which a heavy oil is cracked using a catalyst, hydro-cracking by which a heavy oil is cracked using a catalyst in a hydrogen gas stream with the addition of hydrogen, thermal cracking by which a heavy oil is thermally cracked without using a catalyst, and so forth (see, for example, Japanese Unexamined Patent Publication No. 07-011259 and Japanese Unexamined Patent Publication No. 09-183983).

In addition to the need for a catalyst, catalytic cracking and hydro-cracking require regeneration processing of the catalyst because the catalyst becomes inactive with catalytic cracking of a heavy oil. Further, hydro-cracking requires strict production conditions at a temperature of 500° C. or above and a pressure of 30 to 100 atmospheres. Thermal cracking also requires strict production conditions at a temperature of 400° C. to 500° C. and a pressure of 2 to 30 atmospheres.

SUMMARY OF THE INVENTION

The present invention has worked out in view of the above-mentioned problems, and has an object to provide equipment and process for upgrading oil which can produce a refined oil lighter than a material oil by cracking the heavier material oil with the addition of hydrogen under more relaxed production conditions than those in the prior art without using a catalyst, that is, without the need for regeneration processing of a catalyst.

Equipment and process for upgrading oil to produce a lighter refined oil from a heavier material oil according to an aspect of the invention makes an emulsion by emulsifying ionized alkaline water in the material oil and dropping droplets of the emulsion onto the surface of a heated heat medium.

With the equipment and process for upgrading oil, it is possible to obtain a lighter refined oil from a heavier material oil under more relaxed production conditions than those in the prior art.

DETAILED DESCRIPTION OF THE PREFERRED EMBODIMENTS

Figure 1:
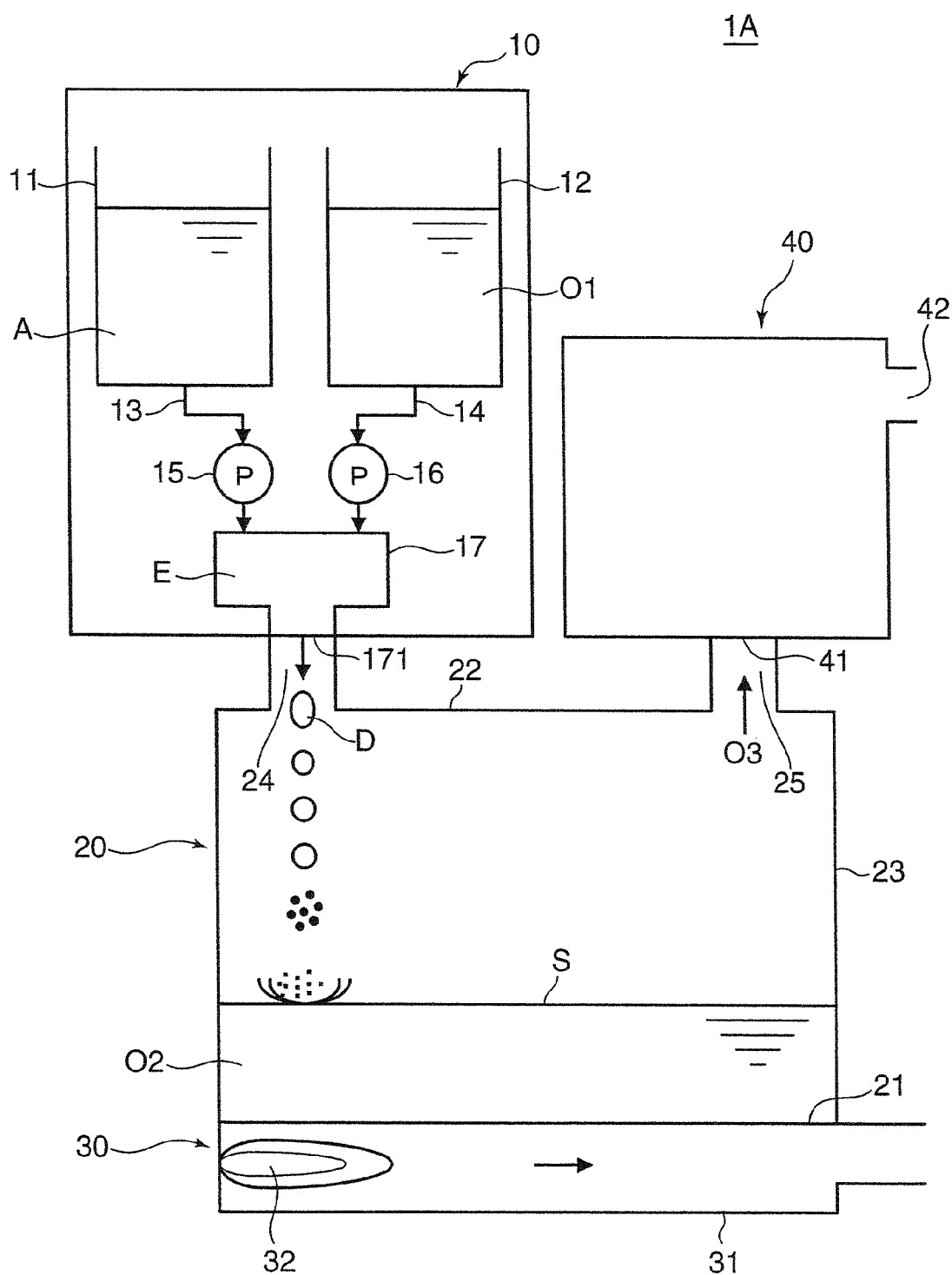
FIG. 1 is a diagram showing a configuration of an equipment for upgrading oil according to an embodiment.

An embodiment of the invention will be described with reference to the drawings. Components labeled with the same reference numerals in the respective drawings denote the same components and descriptions thereof are not repeated herein.

FIG. 1 is a diagram showing a configuration of an equipment for upgrading oil of this embodiment. As is shown in FIG. 1, which is a schematic diagram, an equipment 1A for upgrading oil is an equipment that produces a lighter refined oil O3 from a heavier material oil O1 by making an emulsion E by emulsifying ionized alkaline water A in the material oil O1 first and then dropping droplets D of the emulsion E onto the surface S of a heated heat medium O2. The equipment 1A for upgrading oil comprises, for example, an emulsion making portion 10, a refinery tank portion 20, a heating portion 30, and a refined oil processing portion 40.

The emulsion making portion 10 is an apparatus that makes the emulsion E by emulsifying the ionized alkaline water A in the heavier material oil O1. The emulsion making portion 10 is brought into communication with the refinery tank portion 20 so that droplets D of the produced emulsion E drop onto the surface S of the heat medium O2. The emulsion E is of a water-in-oil type in which fine particles making up the ionized alkaline water A are dispersed in the material oil O1.

The emulsion making portion 10 as above includes, for example, a water tank 11, a material oil tank 12, tubes 13 and 14, pumps 15 and 16, and a mixer 17. The water tank 11 is a reservoir for storing the ionized alkaline water A. The water tank 11 is connected to the mixer 17 via the tube 13 so that the ionized alkaline water A is flown out from the water tank 11 to the mixer 17. The tube 13 is provided with the pump 15 and the pump 15 causes the ionized alkaline water A to be flown out from the water tank 11 to the mixer 17 while adjusting a flow rate. The material oil tank 12 is a reservoir for storing the material oil O1. The material oil tank 12 is connected to the mixer 17 via the tube 14 so that the material oil O1 is flown out from the material oil tank 12 to the mixer 17. The tube 14 is provided with the pump 16 and the pump 16 causes the material oil O1 to be flown out from the material oil tank 12 to the mixer 17 while adjusting a flow rate. The mixer 17 is a device that mixes the ionized alkaline water A and the material oil O1 flown therein. The ionized alkaline water A is emulsified in the material oil O1 by this mixing and the water-in-oil emulsion E is thus produced in the mixer 17. The mixer 17 includes a dropping opening portion 171 that forms the droplets D of the emulsion E and drops them into the refinery tank portion 20.

The refinery tank portion 20 is a reservoir configured not only to store the heat medium O2 but also to introduce the droplets D of the emulsion E made in the emulsion making portion 10 so that the droplets D of the emulsion E are dropped onto the surface S of the heat medium O2. As will be described below, the refined oil O3 is produced as the droplets D of the emulsion E are dropped onto the surface S of the heat medium O2. The refinery tank portion 20 is brought into communication with the refined oil processing portion 40 so that the refined oil O3 is flown out to the refined oil processing portion 40. The refinery tank portion 20 includes, for example, a metal reservoir of a circular cylindrical shape having a bottom 21 and a lid 22 and a relatively large internal volume. An introduction inlet portion 24 and an introduction outlet portion 25 are made in the lid 22. The introduction inlet portion 24 is an opening portion to introduce the droplets D of the emulsion E made in the emulsion making portion 10 to the inside so that the droplets D of the emulsion E are dropped onto the surface S of the heat medium O2 and it is connected to the dropping opening portion 171 of the mixer 17 in the emulsion making portion 10. The introduction outlet portion 25 is an opening portion to introduce the refined oil O3 that is lighter than the material oil O1 to the outside.

The heating portion 30 is an apparatus that heats the refinery tank portion 20. The heat medium O2 is heated as the refinery tank portion 20 is heated. The heating portion 30 is provided, for example, with a burner 32 at one end portion and includes a heating gas duct portion 31 in which is flown a hot combustion gas generated by burning a fuel oil by the burner 32. The heating portion 30 heats the bottom 21 of the refinery tank portion 20 by letting the hot combustion gas generated by burning the fuel oil by the burner 32 flow through the heating gas duct portion 31. Accordingly, heat of the combustion gas is transferred to the heat medium O2 via the refinery tank portion 20 by heat conduction and the heat medium O2 is heated, which induces a convection. As the fuel oil for the burner 32, for example, a heavy oil fuel, such as an inexpensive fuel oil C, is used.

The refined oil processing portion 40 is a reservoir for collecting and storing the refined oil O3 produced in the refinery tank portion 20. The refined oil processing portion 40 includes an introduction inlet portion 41 and an atmospheric opening portion 42. The introduction inlet portion 41 is an opening portion to introduce the refined oil O3 produced in the refinery tank 20 to the inside and is connected to the introduction outlet portion 25 of the refinery tank portion 20. The atmospheric opening portion 42 is an opening portion through which atmospheric air flows in and out freely and it is open to the atmosphere. The generation tank portion 20 communicating with the refined oil processing portion 40 is consequently brought into a state open to the atmosphere. The inside of the refinery tank portion 20 is thus almost at a pressure of the atmosphere. The refined oil processing portion 40 includes, for example, a condenser to condense a gas of the refined oil O3 into a liquid and a storage tank to store the liquid of the refined oil O3 condensed by the condenser. This storage tank is open to the atmosphere. In addition, the refined oil processing portion 40 includes, for example, a fractionating column to fractionate the refined oil O3, a condenser to condense a gas of oil fractionated in the fractionating column into a liquid, and a storage tank to store the liquid of oil condensed by the condenser. This storage tank is open to the atmosphere. Because the condenser condenses a gas of oil to a liquid, a pressure varies inside the refinery tank portion 20 communicating with the refined oil processing portion 40. The variance in pressure, however, is of the order of ±1/100. The inside of the refinery tank portion 20 is therefore almost at a pressure of the atmosphere in this case, too.

In the equipment 1A for upgrading oil configured as above, the ionized alkaline water A is fed and stored in the water tank 11 first, then the heavier material oil O1 is fed and stored in the material oil tank 12, and the heat medium O2 in an amount sufficient to form the liquid surface S is fed and stored in the refinery tank portion 20.

The ionized alkaline water A is ionized alkaline water containing calcium ions ($Ca^{2+}$), and it is an aqueous solution of calcium produced by mixing an aqueous solution of calcium hydroxide ($Ca(OH)_2$), water, and calcium (Ca). The ionized alkaline water A containing calcium ions is adjusted to have the oxidation-reduction potential of −850 mV or below, so that water molecules are readily cracked into oxygen atoms and hydrogen atoms by a phreatic explosion described below through activation of hydrogen. Also, it is adjusted to have a pH of 12 or higher so that a hydrogenation reaction described below takes place efficiently by bringing active hydrogen produced by adjustment of the oxidation-reduction potential and cavitation described below in a relatively stable state. As has been described, the ionized alkaline water A contains calcium ions and is adjusted to have the oxidation-reduction potential of −850 mV or below and the pH of 12 or higher. It is therefore possible to obtain a lighter refined oil effectively from a heavier material oil.

The material oil O1 in the material oil tank 12 may be any heavy oil as long as it can produce the water-in-oil emulsion E when mixed by the mixer 17 and form the droplets D. Examples include but not limited to a crude oil, an atmospheric distillation residue, a vacuum distillation residue, a thermal cracking residue, a coal tar, a fuel oil A, a fuel oil B, and a fuel oil C. These heavy oils may be used as the material oil O1 either solely or in the form of a mixture of two or more kinds of these heavy oils. Alternatively, these heavy oils partially mixed with a light oil may be used as the material oil O1.

As will be described below, the heat medium O2 is a medium that transfers heat to the droplets D of the emulsion E dropped onto the surface S thereof, and it may be any oil (hydrocarbon oil) as long as it is in a liquid state when heated to a specific temperature by the heating portion 30. Because it is heated to about 250 to 400° C. in this embodiment, for example, a heavy oil, such as a fuel oil, is used.

Subsequently, the heating portion 30 is activated. The refinery tank portion 20 is heated by the heating portion 30 and so is the heat medium O2 in the refinery tank portion 20. The heat medium O2 is thus heated to about 250 to 400° C. In addition, because a heavy oil is used as the heat medium O2 in this embodiment, part of the heat medium O2 vaporizes as the heat medium O2 is heated. Accordingly, the inside of the refinery tank portion 20 turns into a gas atmosphere containing the vaporized heat medium O2 at a temperature corresponding to the temperature of the heat medium O2 stored in the refinery tank portion 20.

Subsequently, each of the pump 15 and the pump 16 is activated. The ionized alkaline water A is thus flown out from the water tank 11 to the mixer 17 and at the same time the material oil O1 is flown out from the material oil tank 12 to the mixer 17. The mixer 17 is then activated to mix the ionized alkaline water A and the material oil O1 flown therein. The water-in-oil emulsion E is thus produced. A particle size of fine particles making up the ionized alkaline water A dispersed in the emulsion E is normally 10 μm or smaller, and preferably 3 to 5 μm. A particle size of water smaller than 3 μm is not preferable because cavitation is generated insufficiently in this case, and a particle size of water larger than 5 μm is not preferable, either, because cavitation is generated insufficiently in this case, too.

The emulsion E produced by the mixer 17 is formed in the shape of drops, which are dropped, as the droplets D, from the introduction inlet portion 24 toward the surface S of the heat medium O2 in the refinery tank portion 20. The droplets D thus dropped react with the heat medium O2 to produce the refined oil O3 lighter than the material oil O1.

As to the process by which the dropped droplets D produce the lighter refined oil O3 from the heavier material oil O1, the inventor makes the inference as follows. Specifically, the droplets D of the emulsion E introduced inside from the introduction inlet portion 24 are heated up by heat from the gas in the refinery tank 20. The material oil O1 in the emulsion E is thus heated and the ionized alkaline water A which is in the form of fine particles is heated via the material oil O1. The droplets D of the emulsion E become finer as the droplets D separate by this heating while they are falling down. Meanwhile, the ionized alkaline water A made up of fine particles reaches the boiling point first and vaporizes. Although the vaporized ionized alkaline water A is to expand, such expansion is prevented by a tensile force of the surrounding oil film, which causes the energy to accumulate. The droplets D of the emulsion E fall down further and they are heated at once when they reach the surface of the heat medium O2. This heating causes the vaporized ionized alkaline water A to expand at once and the pressure induced by this expansion exceeds the limit of the tensile force of the surrounding oil film, which gives rise to a micro explosion caused by a phreatic explosion. In this instance, the material oil O1 in the droplets D scatters and the surface area is enlarged by several thousand times (for example, 5000 times) at once. The heating is thus accelerated. In addition, cavitation is generated in the heat medium O2 by the micro explosion. The cavitation raises the temperature in a microscopic fraction of the heat medium O2 having undergone the micro explosion to about 10000° C. and the pressure wave of the cavitation rises to about 350 atmospheres. Cracking occurs consequently in the material oil O1 and the water molecules of the ionized alkaline water are cracked into oxygen atoms and hydrogen atoms. Chemically active hydrogen atoms produced by the cracking of water molecules bind to binding bonds of cleaved carbon atoms produced by the cracking. Hydrogen is thus added to the material oil O1. Further, chemically active oxygen atoms produced by the cracking of water molecules bind to binding bonds of cleaved carbon atoms produced by the cracking. Oxygen, too, is thus added to the material oil O1. The refined oil O3 lighter than the heavier material oil O1 is produced in this manner. Further, the refined oil O3 contains more oxygen than the material oil O1. The above is the inference made by the inventor as to the process by which the dropped droplets D produce the lighter refined oil O3 from the heavier material oil O1.

Accordingly, the proportion of the weight of water in the ionized alkaline water in relative to the weight of the material oil O1 in the emulsion E, weight of water/(weight of material oil O1)×100, is determined by a difference between the hydrogen content in the material oil O1 and the hydrogen content in the light oil to be produced. The water content is higher in the material oil O1 having a higher specific gravity and it is preferably 5 to 30 wt %. In terms of upgrading oil, a proportion of water lower than 5 wt % is not preferable because hydrogen atoms become insufficient in this case. A proportion of water higher than 30 wt % is not preferable, either, because the water content becomes excessively high in this case. In order to produce the emulsion E at the proportion specified above by the mixer 17, the ionized alkaline water A is flown out from the water tank 11 to the mixer 17 while the flow rate is adjusted by the pump 15 and the material oil O1 is flown out from the material oil tank 12 to the mixer 17 while the flow rate is adjusted by the pump 16.

The light refined oil O3 thus produced is introduced out from the introduction outlet portion 25 and collected and stored in the refined oil processing portion 40 provided at the introduction outlet portion 25.

In this manner, it is possible to obtain the lighter refined oil O3 from the heavier material oil O1 by the equipment 1A for upgrading oil. In the equipment 1A for upgrading oil according to this embodiment of the invention, the temperature of the heat medium O2 is about 250 to 400° C. and the production conditions are more relaxed than those in the prior art. A material having lower heat resistance than that in the prior art can be therefore adopted for the refinery tank portion 20. Further, in the equipment 1A for upgrading oil described as above, the refinery tank portion 20 is open to the atmosphere and the production conditions are relaxed further than those in the prior art. The strength of the refinery tank portion 20 can be therefore lower than that in the prior art, which allows the refinery tank portion 20 to adopt a simpler structure than that in the prior art. In addition, because it is not necessary to use a catalyst used in catalytic cracking and hydro-cracking in the equipment 1A for upgrading oil described above, the need for the regeneration processing of a catalyst can be eliminated.

The heat medium O2 is an oil, particularly, a heavy oil in this embodiment. Hence, cracking occurs in part of the oil forming the heat medium O2 when cracking occurs in the raw material O1, and hydrogen is added to the heat medium O2. Part of the oil forming the heat medium O2 is thus converted into a light oil, which flows from the refinery tank portion 20 to the refined oil processing portion 40 and is consumed eventually. It is therefore necessary to replenish the heat medium O2 as needed while the equipment 1A for upgrading oil is operating for a hydrogenation reaction to take place in a satisfactory manner.

Figure 2:
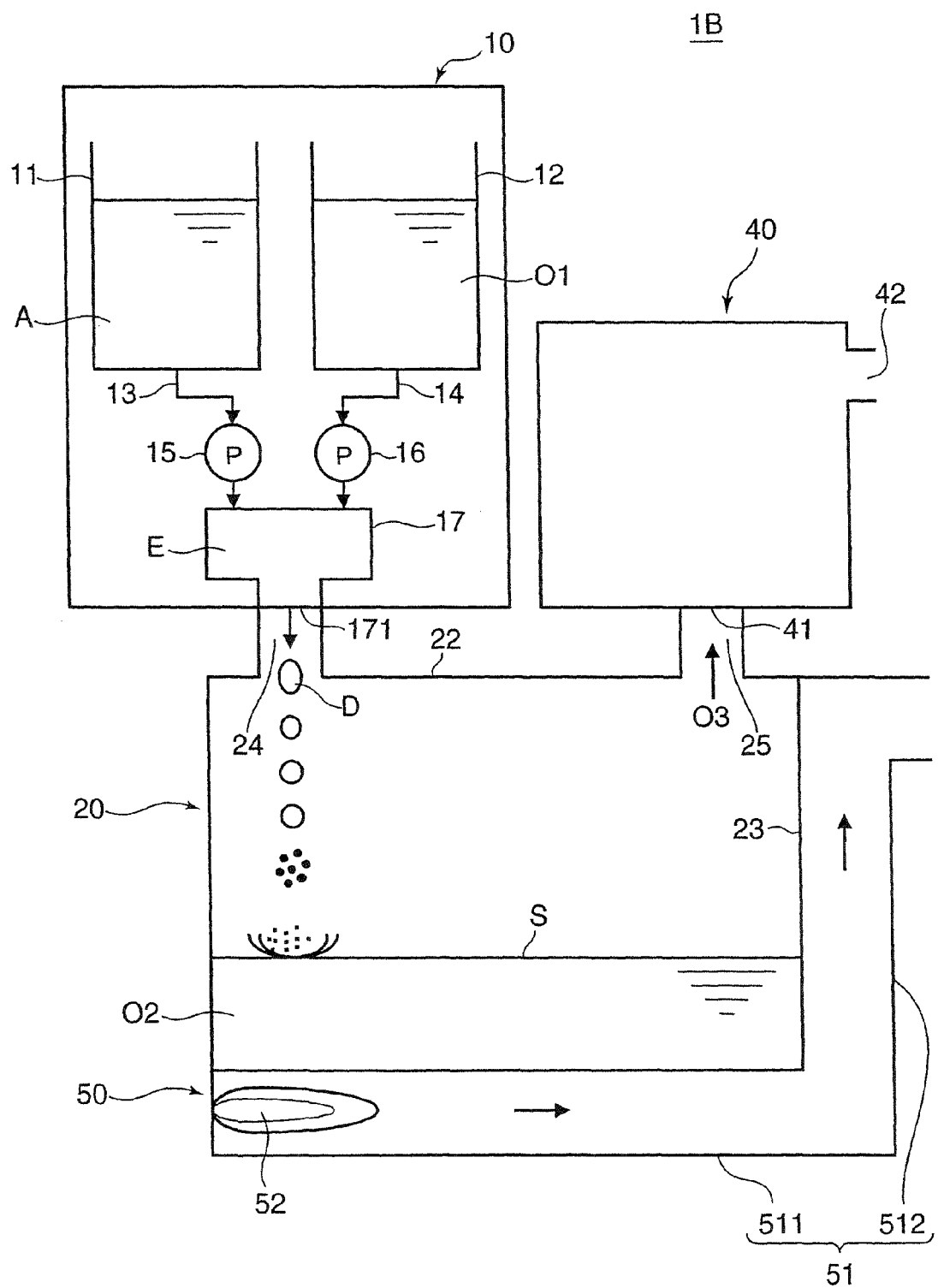
FIG. 2 is a diagram showing a configuration of a heating portion of another equipment for upgrading oil according to the embodiment.

FIG. 2 is a diagram showing a configuration of a heating portion of another equipment for upgrading oil of this embodiment.

In the embodiment described above, the equipment 1A for upgrading oil is configured so as to heat the heat medium O2 in the refinery tank portion 20. However, the equipment for upgrading oil may be configured so as to heat a gas in the refinery tank 20 as well. An equipment 1B for upgrading oil configured as above includes a heating portion 50 shown in FIG. 2, which is a schematic diagram, instead of the heating portion 30 of the equipment 1A for upgrading oil shown in FIG. 1. The heating portion 50 is provided, for example, with a burner 52 at one end portion and includes a heating gas duct portion 51 in which is flown a hot combustion gas generated by burning a fuel oil by the burner 52. The heating gas duct portion 51 is formed by including a bottom surface heating portion 511 extending almost horizontally along the bottom 21 of the refinery tank portion 20 and a side surface heating portion 512 communicating with the bottom surface heating portion 511 and extending upward almost perpendicularly along the side wall 23 of the refinery tank portion 20. The side surface heating portion 512 is bent upward almost at a right angle while communicating with the bottom surface heating portion 511. The emulsion making portion 10, the refinery tank portion 20, and the refined oil processing portion 40 of the equipment 1B for upgrading oil are the same as the corresponding counterparts described above, and descriptions thereof are omitted herein. The heating portion 50 configured as above heats the bottom 21 of the refinery tank portion 20 by letting a hot combustion gas generated by burning a fuel oil by the burner 52 flow through the bottom surface heating portion 511. Heat of the combustion gas is thus transferred to the heat medium O2 via the refinery tank portion 20 by heat conduction, and the heat medium O2 is heated. The heating portion 50 heats the side wall 23 of the refinery tank portion 20 by letting the combustion gas flow from the bottom surface heating portion 511 to the side surface heating portion 512. Heat of the combustion gas is thus transferred to a gas in the refinery tank portion 20 via the refinery tank portion 20 by heat conduction. The heating portion 50 is therefore capable of heating the gas in the refinery tank portion 20 as well.

Figure 3:
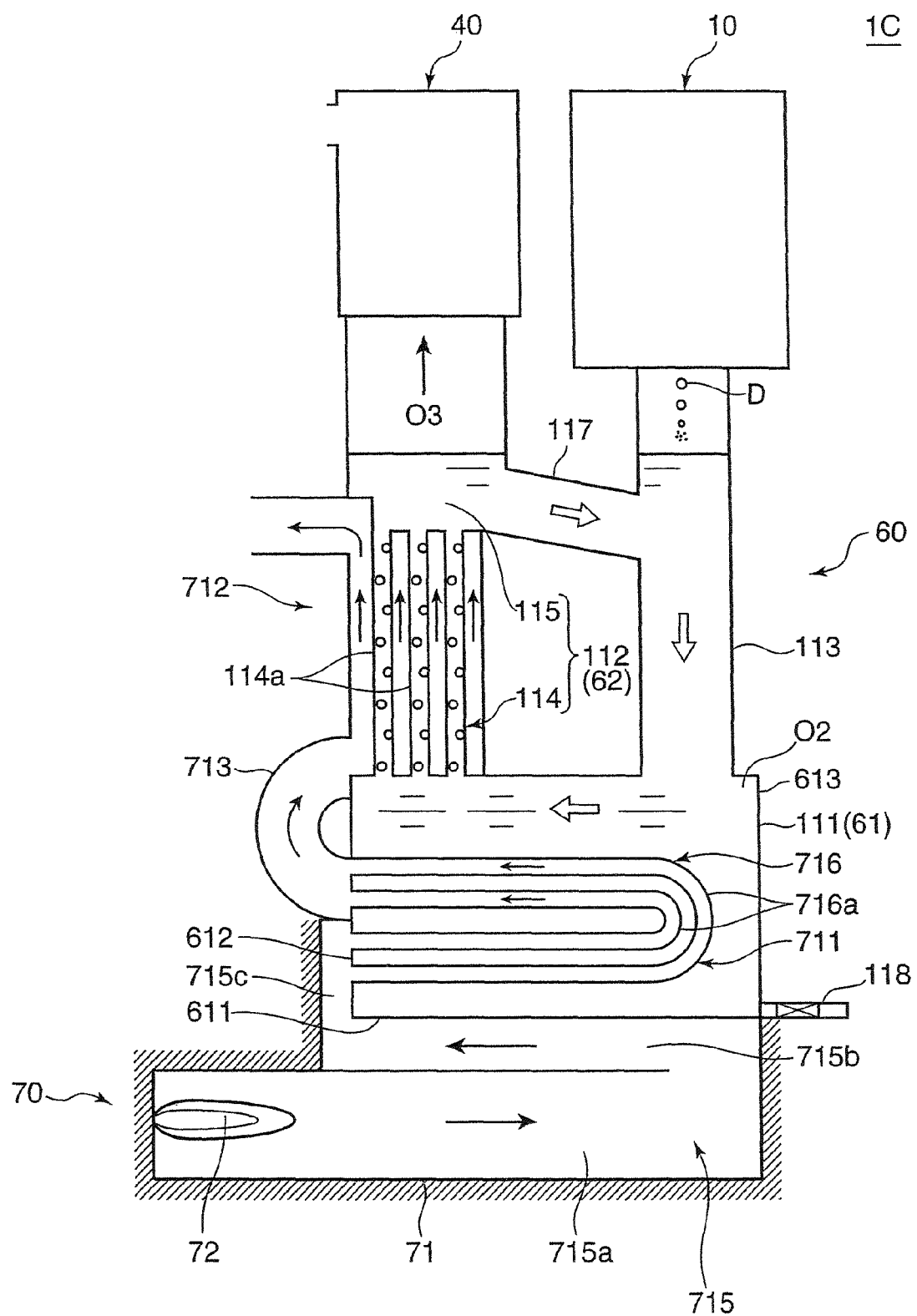
FIG. 3 is a diagram showing a configuration of a refinery tank portion and a heating portion of still another equipment for upgrading oil according to the embodiment.

FIG. 3 is a diagram showing a configuration of a refinery tank portion and a heating portion of still another equipment for upgrading oil according to the embodiment. In the embodiment described above, as is shown in FIG. 3, which is a schematic diagram, an equipment 1C for upgrading oil may be formed using a heating portion 70 and a refinery tank portion 60 in which the heat medium O2 circulates with the heating by the heating portion 70 instead of using the heating portion 30 and the refinery tank portion 20 of the equipment 1A for upgrading oil shown in FIG. 1. Referring to FIG. 3, the refinery tank portion 60 is a reservoir formed in the shape of a closed loop in which the heat medium O2 is allowed to circulate up and down. The heating portion 70 is provided, for example, with a burner 72 at one end portion and includes a heating gas duct portion 71 in which is flown a hot combustion gas generated by burning a fuel oil by the burner 72. The heating gas duct portion 71 is formed by including a lower heating portion 711 that heats the heat medium O2 in a closed loop lower portion 61 of the refinery tank portion 60 and a side heating portion 712 that communicates with the lower heating portion 711 and heats the heat medium O2 that is heated by the lower heating portion 711 and thereby coming up in a closed loop side portion 62 of the refinery tank portion 60.

More specifically, the refinery tank portion 60 includes a lower storage portion 111 having a relatively large internal volume at the lower portion thereof. The lower storage portion 111 forms the lower end portion of the closed loop and corresponds to the closed loop lower portion 61.

As is shown in FIG. 3, the lower storage portion 111 is provided with a first side portion 112 extending upward from one end side (left side in FIG. 3) in the top surface portion and a second side portion 113 extending upward from the other end side (right side in FIG. 3) in the top surface portion. The first side portion 112 includes a heat transfer tube portion 114 formed of a large number of heat transfer tubes 114a each being made of a pipe and a confluent portion 115 provided at the upper end portion of the heat transfer tube portion 114.

The heat transfer tube portion 114 is connected to the top surface portion of the lower storage portion 111 at the lower end portion and each heat transfer tube 114a extends vertically. The interior of each heat transfer tube 114a is brought into communication with the interior of the lower storage portion 111 via a communication hole formed in the top surface of the lower storage portion 111. The confluent portion 115 lies over all the heat transfer tubes 114a. The heat media O2 flowing out from the upper end of each heat transfer tube 114a joins at the confluent portion 115. The closed loop side portion 62 includes the heat transfer tube portion 114 and the confluent portion 115. In short, the heat transfer tube portion 114 and the confluent portion 115 form one side portion of the closed loop.

Meanwhile, the second side portion 113 forms, for example, a circular cylindrical shape. An upper storage portion 117 connects the second side portion 113 and the confluent portion 115 above the bottom storage portion 111. A space which is surrounded by the lower storage portion 111, the first side portion 112, the second side portion 113, and the upper storage portion 117 makes a penetrating space that penetrates through the sheet surface in the depth direction. The upper storage portion 117 forms, for example, a circular cylindrical shape and inclines slightly downward from the first side portion 112 to the second side portion 113. The upper storage portion 117 serves as the upper end portion of the closed loop.

The confluent portion 115 and the second side portion 113 are communicated with each other via the upper storage portion 117. The second side portion 113 is communicated with the lower storage portion 111 via a communication hole made in the top surface portion of the lower storage portion 111. In this manner, the interior of the refinery tank portion 60 is formed in a closed loop in which the lower storage portion 111, the first side portion 112, the second side portion 113, and the upper storage portion 117 communicate with each other. The heat medium O2 is therefore allowed to circulate up and down in the refinery tank portion 60. In short, the interior of the refinery tank portion 60 forms a closed circuit as a whole serving as a circulation channel for a thermal convection. In this embodiment, the upper storage portion 117 and the second side portion 113 together form a circulating portion. Namely, the heat medium O2 flowing out from the first side portion 112 flows to the lower storage portion 111 through the upper storage portion 117 and the second side portion 113. In this embodiment, the refinery tank portion 60 is formed one system with the lower storage portion 111, the first side portion 112, the second side portion 113, and the upper storage portion 117. The heat medium O2 is therefore stored thoroughly in these lower storage portion 111, first side portion 112, second side portion 113, and upper storage portion 117.

The heating portion 70 is provided with the heating gas duct portion 71 in which is flown a combustion gas that heats the heat medium O2 in the refinery tank portion 60. The heating gas duct portion 71 includes the lower heating portion 711, the side heating portion 712, and a connecting portion 713 that connects the both heating portions 711 and 712.

The lower heating portion 711 is to heat the heat medium O2 in the lower storage portion 111 and includes an outer heating portion 715 provided on the outside of the refinery tank portion 60 and an inner heating portion 716 provided on the inside of the refinery tank portion 60. The outer heating portion 715 is provided with a burner 72 at the end portion and is formed of an introduction portion 715a extending almost horizontally, a bottom surface heating portion 715b communicating with the downstream end of the introduction portion 715a and extending almost horizontally along the bottom surface 611 of the refinery tank portion 60, and a connecting portion 715c communicating with the downstream end of the bottom surface heating portion 715b and extending upward along the side wall 612 of the lower storage portion 111. The exterior wall of the outer heating portion 715 is formed with a fire-resistant heat insulator for preventing the radiation of heat of the combustion gas flowing inside the outer heating portion 715.

A combustion gas is generated by burning the burner 72 and the combustion gas flows through the introduction portion 715a, the bottom surface heating portion 715b, and the connecting portion 715c. At this time, heat of the combustion gas is transferred to the heat medium O2 in the lower storage portion 111 via the bottom surface 611 of the refinery tank portion 60 at the bottom heating portion 715b. In other words, the bottom surface 611 of the refinery tank portion 60 serves as a heat transfer surface that transfers the heat of the combustion gas to the heat medium O2.

The inner heating portion 716 is disposed inside the lower storage portion 111 and formed of plural U tubes 716a. Each U tube 716a is fixed to the side wall 612 on one side (left side in FIG. 3) of the lower storage portion 111 so that the both ends of the tube are disposed at top and bottom and provided also to extend horizontally from the side wall 612 toward the opposite side wall 613. The curved portion of the U tube 716a is disposed near the opposite side wall 613. By providing the curved portion in a state spaced apart from the side wall 613, even when the U tubes 716a undergo thermal expansion, it is possible to control heat stress of the U tubes 716a.

One end on the lower side of the U tube 716a is communicated with the connecting portion 715c via a communication hole made in the side wall 612. Meanwhile, one end on the upper side of the U tube 716a is communicated with the communicating portion 713 via a communication hole made in the side wall 612. The communication portion 713 is communicated with the U tubes 716a at the lower end and is provided on the outside of the refinery tank portion 60. The communicating portion 713 is communicated with the lower end of the side heating portion 712 at the upper end portion. The communicating portion 713 is covered with a heat insulator.

The side heating portion 712 is adapted for heating the heat medium O2 in the first side portion 112, and is provided to surround the heat transfer tube portion 114, for example, of a circular cylindrical member extending upward along the first side portion 112 from the lower end portion of the first side portion 112. The side heating portion 712 is communicated with the communicating portion 713 at the lower end. In other words, the heat medium O2 in the heat transfer tube portion 114 is heated by a combustion gas flowing upward on the outside of the heat transfer tubes 114a in the side heating portion 712.

The refinery tank portion 60 is provided with an unillustrated level detector (for example, a level sensor) to detect the liquid surface S of the heat medium O2 stored therein. The level detector is provided, for example, to the upper end portion of the second side portion 113. It is provided so as to control a heating amount of the heating portion 70 and a feed amount of the heat medium O2 to be fed from an unillustrated feeding portion in such a manner that an amount of the heat medium O2 in the refinery tank portion 60 falls within a range for keeping the liquid surface S of the heat medium O2 on the upper side of the second side portion 113 and for keeping a normal circulation.

Also, the refinery tank portion 60 is provided with an exhausting tube 118 for exhausting the remaining materials in the refinery tank portion 60. The exhausting tube 118 is provided at the lower end portion of the lower storage portion 111 and used to exhaust the heat medium O2 (oil content in this embodiment) remaining at the bottom of the tank.

The refined oil processing portion 40 is provided at the upper end portion of the first side portion 112 and the emulsion making portion 10 is provided at the upper end portion of the second side portion 113. The emulsion making portion 10 is provided so that the droplets D of the emulsion E are dropped onto the surface S of the heat medium O2 that streams down in the second side portion 113 of the refinery tank portion 60. The emulsion making portion 10 and the refined oil processing portion 40 of the equipment 1C for upgrading oil are the same as the corresponding counterparts described above and descriptions thereof are omitted herein.

In this equipment 1C for upgrading oil configured as above, the refined oil O3 is produced from the material oil O1 as the droplets D of the emulsion E are dropped onto the surface S of the heat medium O2 that streams down in the second side portion 113.

More specifically, in the equipment 1C for upgrading oil, the ionized alkaline water A is first fed and stored in the water tank 11, then the heavier material oil O1 is fed and stored in the material oil tank 12, and the heat medium O2 in an amount sufficient to form the liquid surface S is fed and stored in the refinery tank portion 20. Subsequently, the heating portion 70 starts to work and the interior of the refinery tank portion 60 is heated by a combustion gas, for example, at about 700 to 800° C. generated by burning the burner 72. In other words, the combustion gas from the burner 72 flows through the introduction portion 715a, after which it heats the refinery tank portion bottom surface 611 in the bottom surface heating portion 715b and flows into the inner heating portion 716 through the connecting portion 715c. In the inner heating portion 716, the combustion gas heats the heat medium O2 in the lower storage portion 111 and flows into the side heating portion 712 through the communication portion 713. In the side heating portion 712, the combustion gas heats the heat medium O2 in the first side portion 112 and is then exhausted. Meanwhile, in the refinery tank portion 60, the heat medium O2 heated by the combustion gas in the lower storage portion 111 comes up and flows into the respective heat transfer tubes 114a of the heat transfer tube portion 114. The heat medium O2 is heated in the heat transfer tubes 114a to the temperature that it comes to a boil in part. Accordingly, it turns into a gas-liquid mixing fluid having a low density in general average in the heat transfer tubes 114a and generates an intense upward flow. This generates a fast circulating flow in the refinery tank portion 60, in which the heat medium O2 circulates through the lower storage portion 111, the first side portion 112, the upper storage portion 117, and the second side portion 113 sequentially in this order. Hence, because the heat medium O2 comes down at a high speed in the second side portion 113, a cone-shaped swirl is being formed on the surface S of the heat medium O2 in the second side portion 113. When the droplets D of the emulsion E made in the refinery tank portion 20 are dropped onto the surface S on which the swirl is being formed, the droplets D are drawn into the swirl. Heat is transferred to the droplets D from the heat medium O2 while they are coming down in the second side portion 113 together with the heat medium O2, therefore, the droplets D are heated up at once. The droplets D thus undergo a micro explosion while coming down in the second side portion 113 and cavitation is generated. Also, a micro explosion can occur while the slightest part of the droplets D flows transversely in the lower storage portion 111. The material oil O1 is converted to the lighter refined oil O3 by the cavitation. The refined oil O3 flows into the first side portion 112 together with the heat medium O2 and separates from the heat medium O2 toward the upper side of the first side portion 112, after which it is introduced into the refined oil processing portion 40 from the upper end portion of the first side portion 112. In the equipment 1C for upgrading oil configured as above, a natural convection occurs efficiently in the refinery tank portion 60 by the heating portion 70 as has been described above. The heating efficiency of the heat medium O2 can be thus enhanced.

An experiment will now be described. Table 1 below is a table showing results of the experiment for upgrading oil. Table 2 below is a table showing results of distillation analysis on the material oil. Table 3 below is a table showing results of distillation analysis on the refined oil. Table 4 below is a table showing results of analysis on the density, the flash point, and the sulfur content of the material oil. Table 5 below is a table showing results of analysis on the density, the flash point, and the sulfur content of the refined oil.

TABLE 1

Result of Oil Upgrading Experiment

| | | |
|---|---|---|
| Material Oil | Fuel Oil C | 32.00 kg |
| | Fuel Oil A | 4.63 kg |
| | Kerosene | 20.02 kg |
| | Sum of Material oil | 56.65 kg |
| Ionized Alkaline Water (Containing Ca ions) | | 11.00 kg |
| Residue | | 0.68 kg |
| Loss by Evaporation | | 2.73 kg |
| Refined oil | | 64.24 kg |
| Increased Amount of Refined oil | | 7.59 kg |

TABLE 2

Result of Distillation Analysis on Material oil

| | |
|---|---|
| 5% Distillation Temperature | 113.7° C. |
| 10% Distillation Temperature | 141.3° C. |
| 20% Distillation Temperature | 166.7° C. |
| 30% Distillation Temperature | 190.5° C. |
| 40% Distillation Temperature | 221.3° C. |
| 50% Distillation Temperature | 250.4° C. |
| 60% Distillation Temperature | 276.7° C. |
| 70% Distillation Temperature | 309.2° C. |
| 80% Distillation Temperature | 349.4° C. |
| 90% Distillation Temperature | 390.1° C. |
| 95% Distillation Temperature | 413.3° C. |

TABLE 3

Result of Distillation Analysis on Refined oil

| | |
|---|---|
| 5% Distillation Temperature | 157.5° C. |
| 10% Distillation Temperature | 163.5° C. |
| 20% Distillation Temperature | 171.0° C. |
| 30% Distillation Temperature | 178.0° C. |
| 40% Distillation Temperature | 185.5° C. |
| 50% Distillation Temperature | 193.5° C. |
| 60% Distillation Temperature | 202.5° C. |
| 70% Distillation Temperature | 212.0° C. |
| 80% Distillation Temperature | 221.0° C. |
| 90% Distillation Temperature | 244.0° C. |
| 95% Distillation Temperature | 261.0° C. |

TABLE 4

Result of Analysis on Density, Flash Point, and Sulfur Content of Material oil

| | |
|---|---|
| Density (15° C.) | 0.9648 |
| Flash Point | 77.0° C. |
| Sulfur Content | 2.28 wt % |

TABLE 5

Result of Analysis on Density, Flash Point, and Sulfur Content of Refined oil

| | |
|---|---|
| Density (15° C.) | 0.7926 |
| Flash Point | 32.5° C. |
| Sulfur Content | 0.06 wt % |

Initially, 11.00 kg (Table 1 above) of ionized alkaline water, which contained calcium ions and was adjusted to have the oxidation-reduction potential of −850 mV or below and a pH of 12 or higher, was fed and stored in the water tank 11.

As is set forth in Table 1 above, the material oil O1, which is a mixture oil of 32.00 kg of fuel oil C, 4.63 kg of fuel oil A, and 20.02 kg of kerosene, was fed and stored in the material oil tank 12. According to analysis on the material oil O1 made by Marine & Oil Surveyors Co., Ltd. (2-9-1, Motomachi-Dori, Chuo-ku, Kobe, Hyogo, Japan), the results are shown in Table 2 and Table 4. According to Table 2 above, the temperature rises gradually from 113.7° C. to 413.3° C. at 5% distillation to 95% distillation, and according to Table 4 above, the density is 0.9648 at 15° C. and the flash point is 77.0° C. Hence, it is confirmed that the material oil O1 is a heavy oil. It also contains 2.28 wt % of sulfur.

At the liquid level forming the liquid surface S, for example, at about ⅓ depth of the refinery tank portion 20, the heat medium O2 was fed and stored in the refinery tank portion 20. Subsequently, the heat medium O2 was heated at the heat portion 30 to about 250 to 400° C. In this case, the temperature of a gas (including the vaporized heat medium O2) inside the refinery tank portion 20 was about 280 to 450° C. The flow rates of the pumps 15 and 16 were then adjusted for the emulsion E to be produced from the ionized alkaline water and the material oil O1, and the emulsion E was produced by the mixer 17. The droplets D of the emulsion E thus produced were dropped onto the surface of the heat medium O2. Consequently, 64.24 kg of refined oil (Table 1 above) was obtained. In this case, 0.68 kg of residue (Table 1 above) was remained at the bottom of the refinery tank portion 20, and substances, such as moisture vapor, the material oil O1, and the refined oil O3, flown out from the portion open to the atmosphere as a loss by evaporation was 2.73 kg (Table 1 above).

According to analysis on the refined oil O3 made by Marine & Oil Surveyors Co., Ltd., the results are shown in Table 3 and Table 5. According to Table 3 above, the temperature rises gradually at 5% distillation to 95% distillation only in a range of 157.5° C. to 261.0° C. Also, according to Table 5 above, the density is 0.7926 at 15° C. and the flash point is 32.5° C. It is therefore confirmed that the refined oil O3 is a light oil, in particular, kerosene. It is confirmed further that sulfur reduces to 0.06 wt %.

One comparative example will now be described. A comparison was made in a case where the refined oil O3 is produced from the material oil O1 using the equipment 1A for upgrading oil shown in FIG. 1, and in a case where the refined oil O3 is produced from the material oil O1 by means of the conventional thermal cracking method using an equipment formed by omitting the emulsion making portion 10 from the configuration of the equipment 1A for upgrading oil shown in FIG. 1. The components forming the material oil O1 were the same in each case.

Figure 4:
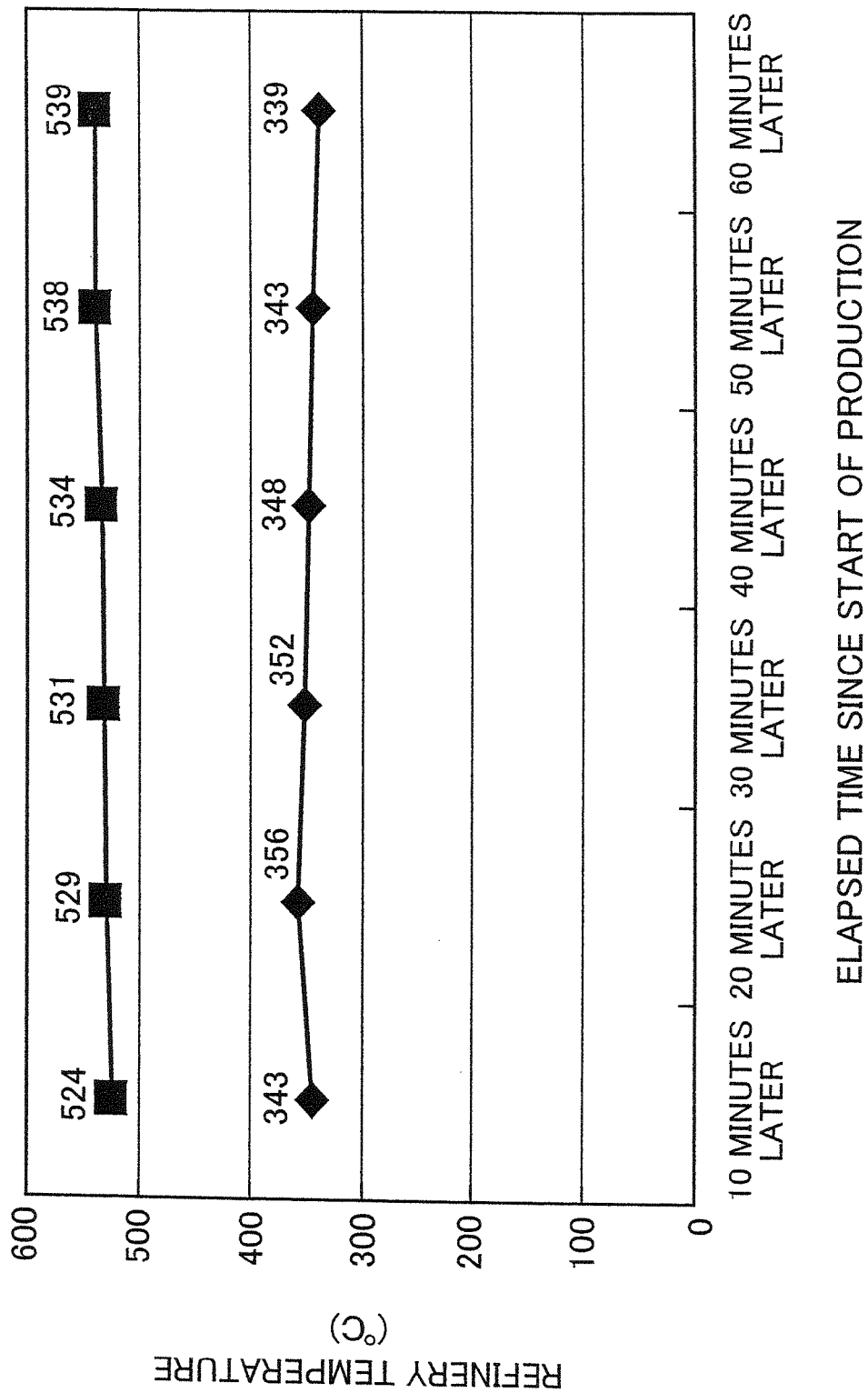
FIG. 4 is a diagram showing refinery temperatures with elapsed times by an inventive process of upgrading oil and by means of a conventional thermal cracking.
Figure 5:
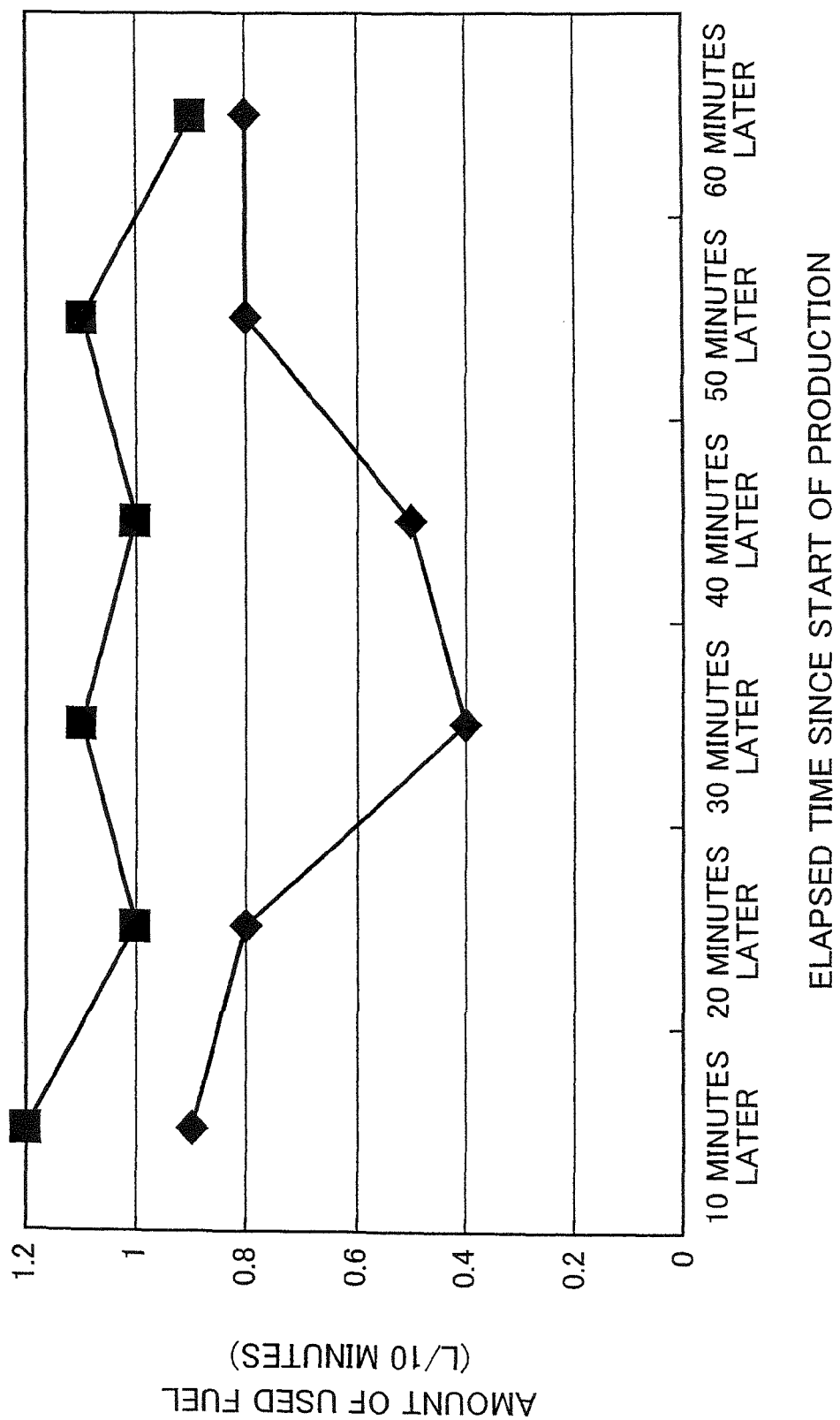
FIG. 5 is a diagram showing amounts of used fuel with elapsed times by the inventive process of upgrading oil and by means of the conventional thermal cracking.
Figure 6:
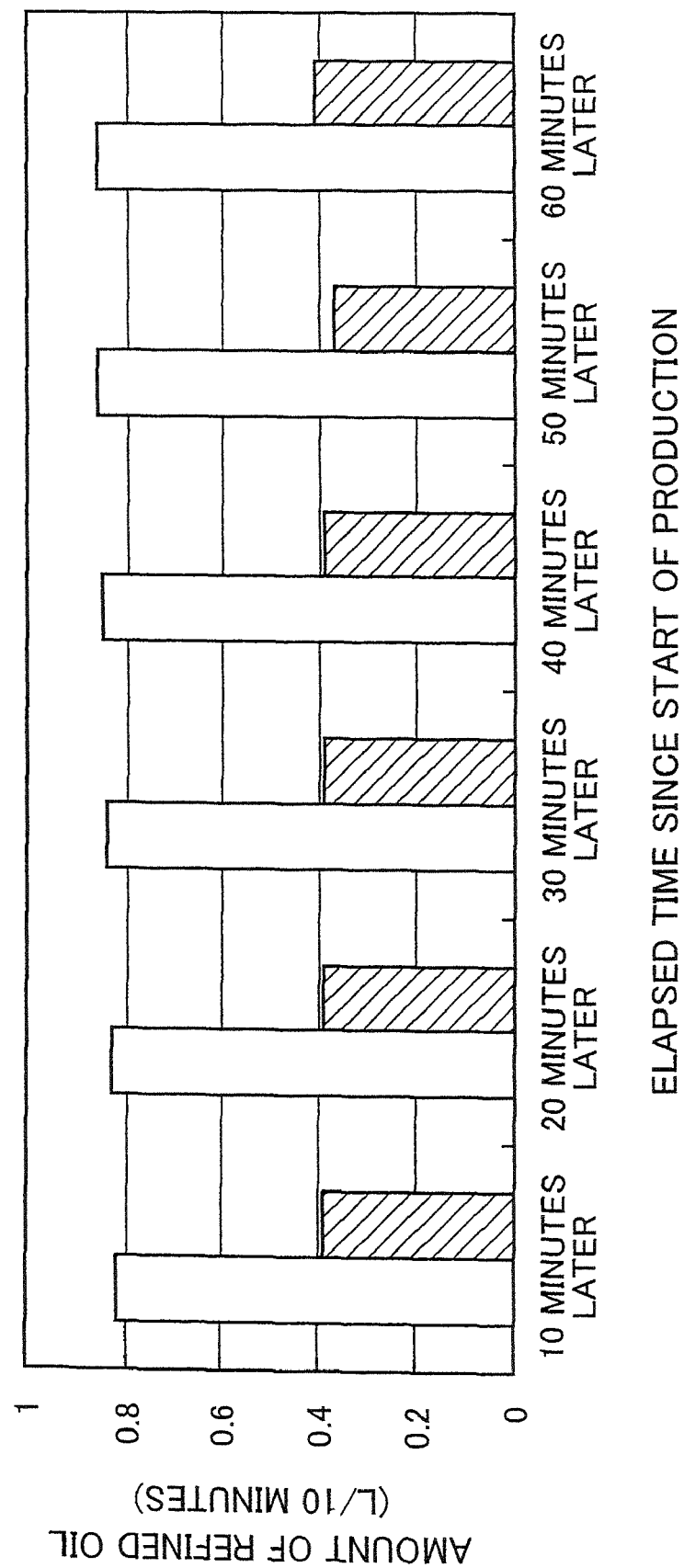
FIG. 6 is a diagram showing amounts of refined oil with elapsed times by the inventive process of upgrading oil and by means of the conventional thermal cracking.

FIG. 4 is a diagram showing refinery temperatures with elapsed times by an inventive process of upgrading oil and by a conventional thermal cracking method. FIG. 5 is a diagram showing an amount of used fuel with elapsed times by an inventive process of upgrading oil and by a conventional thermal cracking method. FIG. 6 is a diagram showing an amount of refined oil with elapsed times by an inventive process of upgrading oil and by a conventional thermal cracking method. The abscissa in FIG. 4 through FIG. 6 is used for the elapsed times since the start of production. The ordinate in FIG. 4 is used for the temperature (refinery temperature) inside the refinery tank portion 20 indicated by the unit of ° C. The ordinate in FIG. 5 is used for an amount of used fuel per unit time (an amount of used fuel per ten minutes) indicated by the unit of liter/10 minutes. The ordinate in FIG. 6 is used for an amount of refined oil per unit time (an amount of refined oil per ten minutes) indicated by the unit of litter/10 minutes. The mark ♦ in FIG. 4 and FIG. 5 denotes the refinery temperature by the inventive process of upgrading oil and the mark ■ in FIG. 4 and FIG. 5 denotes the refinery temperature by the conventional thermal cracking method. Of a pair of bar charts in FIG. 6, the outline bar chart (on the left side on the sheet surface) represents an amount of refined oil by the inventive process of upgrading oil and the hatched bar chart (on the right side on the sheet surface) represents an amount of refined oil by the conventional thermal cracking method.

As can be understood from FIG. 4, according to the conventional thermal cracking method, the temperature in the refinery tank portion 20 in a period from the start of production to 60 minutes later is in a range of 524° C. to 539° C. and the average temperature is 533° C. On the contrary, according to the inventive process of upgrading oil, the temperature in the refinery tank portion 20 is in a range of 339° C. to 356° C. and the average temperature is 347° C. Hence, the refinery temperature is lower in the case of the inventive process of upgrading oil than in the case of the conventional thermal cracking method, and the production conditions are more relaxed. When the average temperatures are compared, it is lower by as much as 186° C. in the former than in the latter.

Consequently, as can be understood from FIG. 5, according to the conventional thermal cracking method, an amount of used fuel per ten minutes in a period from the start of production to 60 minutes later is in a range of 0.9 liter/10 minutes to 1.2 liters/10 minutes and the average amount of used fuel is 1.05 liters/10 minutes. An amount of used fuel for one hour is 6.3 liters. On the contrary, according to the inventive process of upgrading oil, an amount of used fuel per ten minutes in a period from the start of production to 60 minutes later is in a range of 0.4 liter/10 minutes to 0.9 liter/10 minutes and the average amount of used fuel is 0.7 liter/10 minutes. An amount of used fuel for one hour is 4.2 liters. Accordingly, an amount of used fuel is smaller in the case of the inventive process of upgrading oil than in the case of the conventional thermal cracking method. When the amounts of used fuel per unit time are compared using the average amounts of used fuel, it is smaller by as much as 0.35 liter/10 minutes in the former than in the latter. When the amounts of used fuel for one hour are compared, it is smaller by as much as 2.1 liters in the former than in the latter.

Meanwhile, as can be understood from FIG. 6, according to the conventional thermal cracking method, an amount of production of the refined oil O3 per 10 minutes in a period from the start of production to 60 minutes later is in a range of 0.37 liter/10 minutes to 0.41 liter/10 minutes. An amount of production for one hour is 2.3 liters. On the contrary, according to the inventive process of upgrading oil, an amount of production of the refined oil O3 per ten minutes in a period from the start of production to 60 minutes later is in a range of 0.82 liter/10 minutes to 0.86 liter/10 minutes. An amount of production for one hour is 5.1 liters. Accordingly, it is possible to obtain a larger amount of the refined oil O3 from a smaller amount of used fuel by the inventive process of upgrading oil than by the conventional thermal cracking method and energy efficiency is better in the former than in the latter. In order to obtain 1 liter of the refined oil O3, a fuel of about 2.74 liters is necessary for the conventional thermal cracking method. On the contrary, in order to obtain 1 liter of the refined oil O3, only a fuel of about 0.824 liter is necessary for the inventive process of upgrading oil.

As has been described, for the equipment 1 for upgrading oil, there is no need to use a catalyst used in catalytic cracking and hydro-cracking, which eliminates the need for the regeneration processing of a catalyst. In addition, it is possible to obtain the lighter refined oil O3 from the heavier material oil O1 under the relatively relaxed production conditions in comparison with those in the prior art. Moreover, energy efficiency to obtain the refined oil O3 is more satisfactory.

Further, with the equipment 1 for upgrading oil, in a case where the material oil O1 contains sulfur, hydrogen atoms produced by the cracking of water molecules may react with sulfur in the material oil O1 to produce hydrogen sulfide ($H_2S$), which enables desulfurization.

The present description discloses various inventions as described above. Of these inventions, the main inventions can be summarized as follows.

An equipment for upgrading oil to produce a lighter refined oil from a heavier material oil according to an aspect of the invention comprises: an emulsion making portion configured to make an emulsion by emulsifying ionized alkaline water having oxidation-reduction potential of −850 mV or below and a pH of 12 or higher in the material oil; a refinery tank portion configured to store a heat medium and to introduce droplets of the emulsion therein so that the droplets of the emulsion are dropped onto a surface of the heat medium; and a heating portion configured to heat the refinery tank portion. Also, a process of upgrading oil to produce a lighter refined oil from a heavier material oil according to another aspect of the invention comprises: producing an emulsion by emulsifying ionized alkaline water having oxidation-reduction potential of −850 mV or below and a pH of 12 or higher in the material oil, and dropping droplets of the emulsion onto a surface of a heated heat medium.

According to the equipment for upgrading oil and the process of upgrading oil configured as above, it is possible to obtain a lighter refined oil from a heavier material oil under relatively relaxed producing conditions. In addition, because there is no need to use a catalyst used in catalytic cracking and hydro-cracking, the need for the regeneration processing of a catalyst can be eliminated.

The equipment for upgrading oil described above may be characterized in that the refinery tank portion is open to atmosphere. The process of upgrading oil described above may be characterized in that the droplets of the emulsion are dropped onto the surface of the heated heat medium in a state open to the atmosphere.

According to the equipment for upgrading oil and the process of upgrading oil configured as above, it is possible to obtain a lighter refined oil from a heavier material oil under further relaxed production conditions.

Also, the equipment for upgrading oil and the process of upgrading oil described above may be characterized in that a particle size of the ionized alkaline water emulsified in the emulsion is 3 to 5 μm.

According to the equipment for upgrading oil and the process of upgrading oil configured as above, it is possible to obtain a lighter refined oil from a heavier material oil effectively.

Also, the equipment for upgrading oil and the process of upgrading oil described above may be characterized in that a proportion of a weight of water of the ionized alkaline water in relative to a weight of the heavy oil in the emulsion is 5 to 30 wt %.

According to the equipment for upgrading oil and the process of upgrading oil configured as above, it is possible to obtain a lighter refined oil from a heavier material oil effectively.

Further, the equipment for upgrading oil and the process of upgrading oil described above may be characterized in that the ionized alkaline water contains calcium ions.

According to the equipment for upgrading oil and the process of upgrading oil configured as above, it is possible to obtain a lighter refined oil from a heavier material oil effectively.

In addition, the equipment for upgrading oil described as above may be characterized in that an interior of the refinery tank portion is formed in a shape of a closed loop for allowing the heat medium to circulate up and down, and that the heating portion includes a heating gas duct portion for a hot gas to flow therein, which includes a lower heating portion configured to heat the heat medium in a closed loop lower portion of the refinery tank portion and a side heating portion configured to heat the heat medium that is heated by the lower heating portion and thereby coming up in a closed loop side portion of the refinery tank portion.

According to the equipment for upgrading oil configured as above, a natural convection is induced effectively in the refinery tank portion and heating efficiency of the heat medium can be enhanced.

While the invention of the present application has been described appropriately and fully by way of the embodiment as above with reference to the drawings in order to express the invention of the present application, it should be appreciated that anyone skilled in the art can readily change and/or modify the embodiment described above. It is therefore understood that a changed embodiment or a modified embodiment implemented by anyone skilled in the art is enclosed within the scope of the appended claims unless the changed embodiment or the modified embodiment is of a level that deviates from the scope of the appended claims.

INDUSTRIAL APPLICABILITY

According to the invention, it is possible to provide an equipment for upgrading oil and a process of upgrading oil capable of obtaining a lighter refined oil from a heavier material oil.

What is claimed is:

1. An equipment for upgrading oil to produce a lighter refined oil from a heavier material oil, comprising:
   an emulsion making portion having a water tank storing ionized alkaline water, a material oil tank storing the material oil and a mixer communicating with the water tank and the material oil tank, the mixer being operative for emulsifying the ionized alkaline water in the material oil and including a dropping opening that forms droplets of the emulsion of the ionized alkaline water and the material oil and drops the droplets from the emulsion making portion;
   a refinery tank having an inlet communicating with the dropping opening of the mixer for receiving the droplets of the emulsion, the refinery tank including a heat medium disposed at least partially in a position below the dropping opening so that the droplets of the emulsion are dropped toward the heat medium, the refinery tank further having an outlet;
   a heater disposed adjacent at least one surface of the refinery tank; and
   a refined oil processor having an inlet communicating with the outlet of the refinery tank to receive refined oil produced in the refinery tank, the refined oil processor further including an atmospheric opening disposed for permitting a flow of atmospheric air into and out of the refined oil processor.

2. The equipment of claim 1, wherein the heater is adjacent at least two surfaces of the refinery tank.

3. The equipment of claim 2, wherein the heater is adjacent the heat medium of the refinery tank.

4. The equipment of claim 1, further comprising a water pump communicating with the water tank and the mixer and a material oil pump communicating with the material oil tank and the mixer, the water pump and the material oil pump controlling flow rates of the ionized alkaline water and the material oil to the mixer.

5. The equipment of claim 4, wherein the water pump and the material oil pump are operative to produce a proportion of a weight of water of the ionized alkaline water relative to a weight of the heavy oil in the emulsion in a range of 5 to 30 wt %.

6. The equipment of claim 1, wherein the mixer is operative to produce a particle size of the ionized alkaline water emulsified in the emulsion in a range of 3 to 5 µm.

* * * * *